United States Patent
Stenneth et al.

(10) Patent No.: US 12,460,932 B2
(45) Date of Patent: Nov. 4, 2025

(54) SYSTEM AND METHOD FOR DETECTING A ROAD WORKS ZONE

(71) Applicant: HERE Global B.V., Eindhoven (NL)

(72) Inventors: Leon Stenneth, Chicago, IL (US);
Bruce Bernhardt, Wauconda, IL (US);
Advait Mohan Raut, MH (IN);
Jingwei Xu, Buffalo Grove, IL (US);
Yuxin Guan, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 383 days.

(21) Appl. No.: 18/077,035

(22) Filed: Dec. 7, 2022

(65) Prior Publication Data
US 2024/0191998 A1    Jun. 13, 2024

(51) Int. Cl.
G01C 21/34    (2006.01)
G01C 21/00    (2006.01)
G08G 1/01     (2006.01)

(52) U.S. Cl.
CPC ..... G01C 21/3407 (2013.01); G01C 21/3815 (2020.08); G08G 1/0137 (2013.01)

(58) Field of Classification Search
CPC ............................. G08G 1/0133; G06V 20/54

USPC ......................................................... 701/423
See application file for complete search history.

(56) References Cited

U.S. PATENT DOCUMENTS

| | | | |
|---|---|---|---|
| 9,221,461 B2 | 12/2015 | Ferguson et al. | |
| 10,148,917 B2 | 12/2018 | Hegemann et al. | |
| 10,282,999 B2 | 5/2019 | Creusot | |
| 10,816,993 B1 | 10/2020 | Tran | |
| 2020/0364473 A1* | 11/2020 | Silver | G05D 1/0223 |
| 2021/0295688 A1* | 9/2021 | Kourous-Harrigan | E01F 9/30 |

* cited by examiner

*Primary Examiner* — Rachid Bendidi
*Assistant Examiner* — Vincent Feng
(74) *Attorney, Agent, or Firm* — DITTHAVONG, STEINER & MLOTKOWSKI

(57) ABSTRACT

The disclosure provides a system, a method, and a computer program product for updating map data. The system, for example, receives, from one or more user equipment, at least one road works observation. The at least one road works observation is associated with a road works object. Further, the system, determines a first lane and a second lane. Further, the first lane is associated with the at least one road works observation and the second lane is associated with the road works object. Further, the system determines traffic density associated with a region in vicinity of the road works object. Further, the system detects the road works zone based on the first lane, the second lane and the traffic density.

15 Claims, 9 Drawing Sheets

SYSTEM AND METHOD FOR DETECTING A ROAD WORKS ZONE

TECHNOLOGICAL FIELD

The present disclosure generally relates to routing and navigation systems, and more particularly relates to systems and methods for detecting a road works zone for routing and navigation applications.

BACKGROUND

Navigation applications for a vehicle generally rely on data stored in a map database for identifying various navigation related entities such as road works objects, links, lane markings, road works detection and the like. In case the vehicle is an autonomous vehicle, accurate detection of navigation related entities becomes more important to provide a safe and reliable navigation service. Often, a route traversed or to be traversed by a user encompasses a construction site. The detection of road works using sensor data is important for autonomous driving. The visual indicators of road works such as cones, barrels, construction related signs, bollards, lane marking color are observed using sensor data. The problem with existing methods is that during high density traffic such as heavy congestion, vehicles in the outer lane do not observe the visual indicators of road works. In heavy traffic, the vehicles in other lanes on the same road link pass by without observing these indicators due to blocking of line of sight. This causes major problem in road works detection system where navigation applications fail to report road works.

Therefore, it is required to provide a method or a system, which is able to detect a road works zone accurately even in high density traffic, to manage traffic better.

BRIEF SUMMARY

Accordingly, in order to provide accurate, safe, and reliable navigation assistance, it is important to detect a road works zone accurately and update it on map data. Further, even more safe, and user-oriented navigation services can be provided to the end users. To this end, the data utilized for providing the navigation assistance should consider accurate and up-to-date navigation instructions for passage of vehicle through various regions and routes. Especially, in the context of navigation assistance for autonomous vehicles and semi-autonomous vehicles to avoid inaccurate navigation, it is important that the assistance provided is real-time, up-to-date, safe, and accurate. There is a need of a system that may detect a road works zone based on the real time observations.

Example embodiments of the present disclosure provide a system, a method, and a computer program product for detecting a road works zone in order to overcome the challenges discussed above, to provide the solutions envisaged as discussed above.

In one aspect, a system for detecting a road works zone is disclosed. The system comprises a memory configured to store computer-executable instructions; and at least one processor configured to execute the computer-executable instructions to receive, from one or more user equipment, at least one road works observation associated with a road works object. The at least one processor is further configured to determine a first lane and a second lane, where the first lane is associated with the one or more user equipment capturing the at least one road works observation and the second lane is associated with the road works object. The at least one processor is further configured to determine traffic density associated with a region in vicinity of the road works object. Further, the road works zone is detected based on the first lane, the second lane and the determined traffic density.

In additional system embodiments, the at least one processor is further configured to compare the determined traffic density of the region with a predefined threshold. Further, the at least one processor is configured to filter the at least one road works observation associated with the road works object based on the comparison.

In additional system embodiments, to filter the at least one road works observation, the at least one processor is further configured to retain the road works observation for detection of the road works zone when the first lane is adjacent to the second lane, based on determining that the determined traffic density of the region is above the predefined threshold, In additional system embodiments, to filter the at least one road works observation, the at least one processor is further configured to retain the road works observation for detection of the road works zone irrespective of the first lane being adjacent to the second lane or not, based on determining that the determined traffic density of the region is below the predefined threshold.

In additional system embodiments, to filter the at least one road works observation, the at least one processor is further configured to assign a weight to the at least one road works observation based on the comparison, the first lane, and the second lane. In additional system embodiments, the weight is proportional to a distance between the first lane and the second lane, when the comparison indicates that the determined traffic density is more than the predefined threshold. Additionally, the road works zone is a construction related road work zone.

In additional system embodiments, the at least one processor is further configured to assign a first weight value to the at least one road works observation, when the first lane is adjacent to the second lane. Further, the at least one processor is configured to assign a second weight value to the at least one road works observation, when the first lane is farther than a lane adjacent to the second lane, such that the second weight value is lesser than the first weight value.

In additional system embodiments, the at least one processor is further configured to assign the same/constant weight to the at least one road works observation when the determined traffic density is lesser than the predefined threshold.

In additional system embodiments, the at least one processor is further configured to determine a first location associated with the at least one road works observation. Further, the first location is a location of the corresponding user equipment at a time of capturing the road works observation. The at least one processor is further configured to determine a second location associated with the road works object based on the first location and one or more positional offsets applied to the first location. Further, the at least one processor is further configured to map match the first location to identify the first lane and map match the second location to identify the second lane.

In additional system embodiments, the at least one processor is further configured to determine the second location, the at least one processor is further configured to apply the one or more positional offsets to the first location at the time of receiving the at least one road works observation. Further, a location obtained after applying the positional offsets to the first location is determined to be the second location.

In some additional system embodiments, to determine the traffic density of the region in vicinity of the road works object, the at least one processor is further configured to perform at least one of: obtain at least one of: real time traffic feed data, traffic volume estimations, probe counts, and computer vision analysis on image data associated with a plurality of road works observations of road works in the region.

In additional system embodiments, the at least one processor is further configured to update a map database based on the detection of the road works zone. Further, the at least one processor is configured to generate one or more navigation instructions for the one or more user equipment based on the detection of the road works zone.

In another aspect, a method for detecting a road works zone is provided. The method comprises receiving, from one or more user equipment, at least one road works observation associated with a road works object. The method further comprises, determining a first lane and a second lane, where the first lane is associated with the one or more user equipment capturing the at least one road works observation and the second lane is associated with the road works object. The method further comprises, determining traffic density associated with a region in vicinity of the at least one road works observation. Further, the method comprises detecting the road works zone based on the first lane, the second lane and the traffic density.

In additional method embodiments, the method further comprises comparing the determined traffic density of the region with a predefined threshold. Further, the method comprises filtering the at least one road works observation associated with the road works object based on the comparison.

In additional method embodiments, filtering the at least one road works observation, comprises retaining the at least one road works observation for detection of the road works zone when the first lane is adjacent to the second lane. Further, filtering is performed based on determining that the determined traffic density of the region is above the predefined threshold.

In additional method embodiments, filtering the at least one road works observation, comprises retaining the at least one road works observation for detection of the road works zone irrespective of the first lane being adjacent to the second lane or not. Further, filtering is performed based on determining that the determined traffic density of the region is below the predefined threshold.

In additional method embodiments, filtering the at least one road works observation, further comprises: assigning a weight to the at least one road works observation based on the comparison, the first lane, and the second lane.

In additional method embodiments, the method comprises assigning a first weight value to the at least one road works observation, when the first lane is adjacent to the second lane. The method further comprises assigning a second weight value to the at least one road works observation, when the first lane is farther than a lane adjacent to the second lane, such that the second weight value is lesser than the first weight value.

In additional method embodiments, the method comprises assigning a same/constant weight to the at least one road works observation when the determined traffic density is lesser than the predefined threshold.

In yet another aspect, a computer program product comprising a non-transitory computer readable medium having stored thereon computer executable instructions which when executed by at least one processor, cause the processor to carry out operations for detecting a road works zone, the operations comprise receiving, from one or more user equipment, at least one road works observation associated with a road works object. Further, the operations comprise determining a first lane and a second lane, when the first lane is associated with the one or more user equipment capturing the at least one road works observation and the second lane is associated with the road works object. Additionally, the operations comprise determining traffic density associated with a region in vicinity of the road works object. Further, the operations comprise detecting the road works zone based on the first lane, the second lane and the traffic density.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
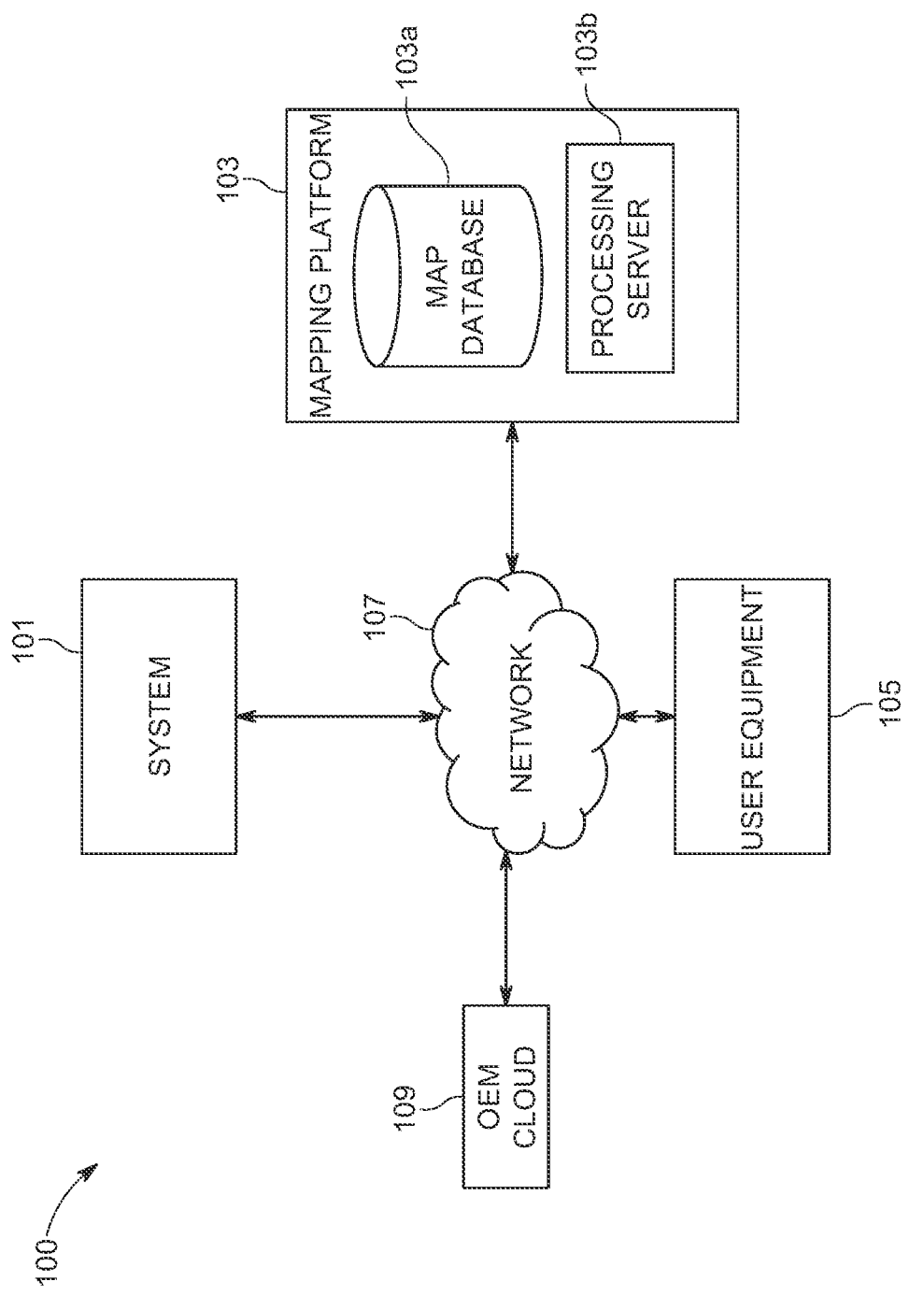
Figure 2A:
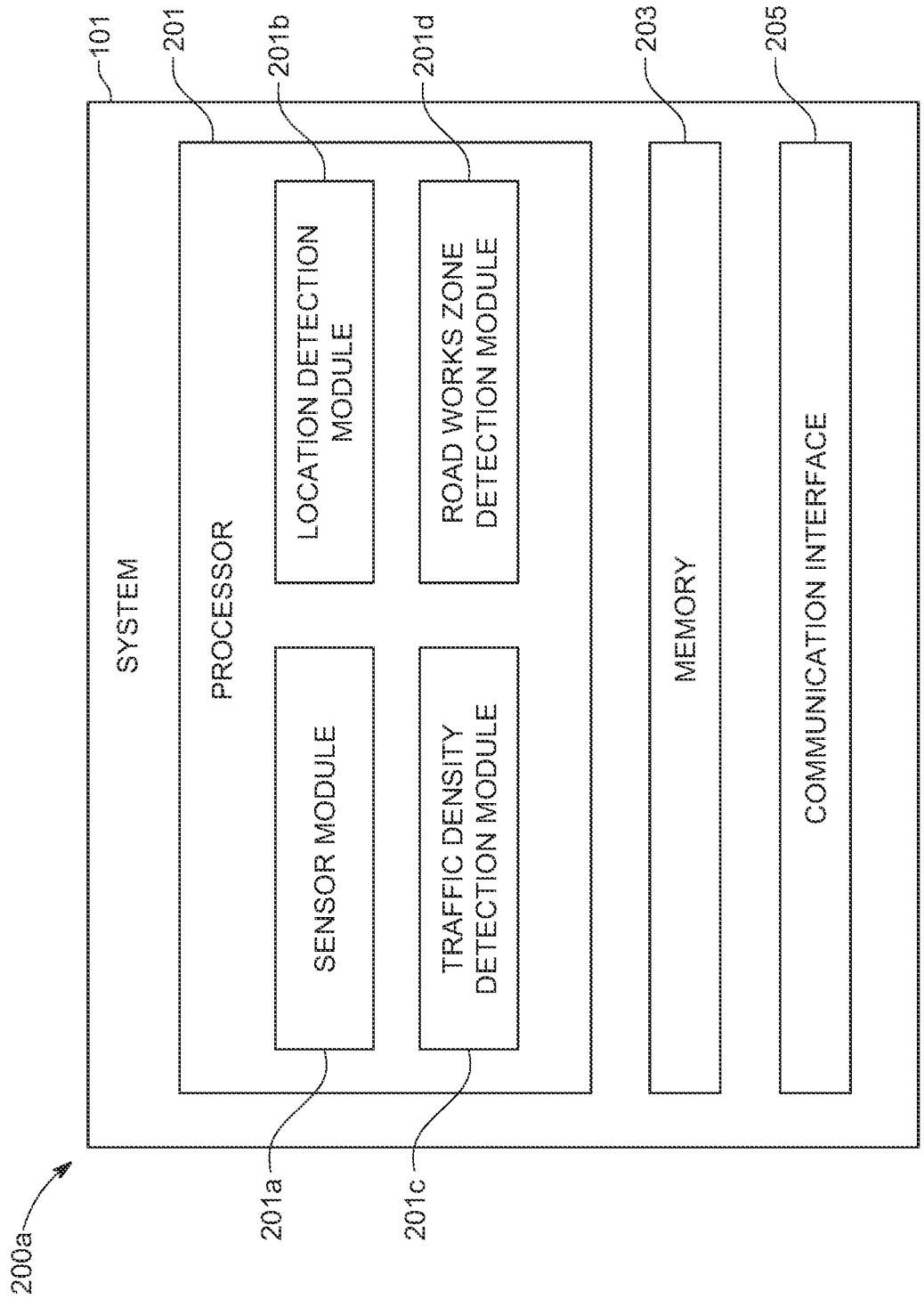
Figure 2B:
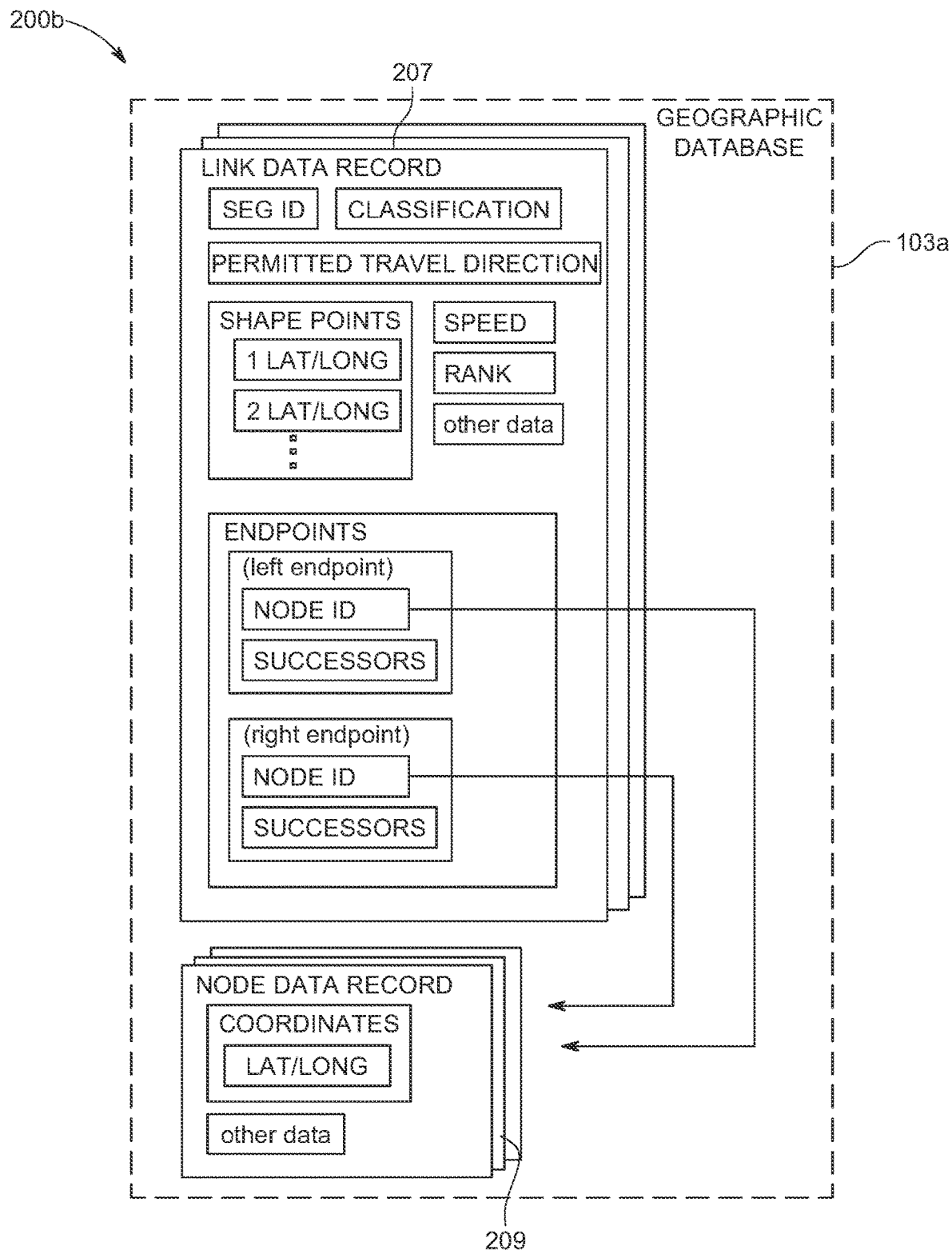
Figure 2C:
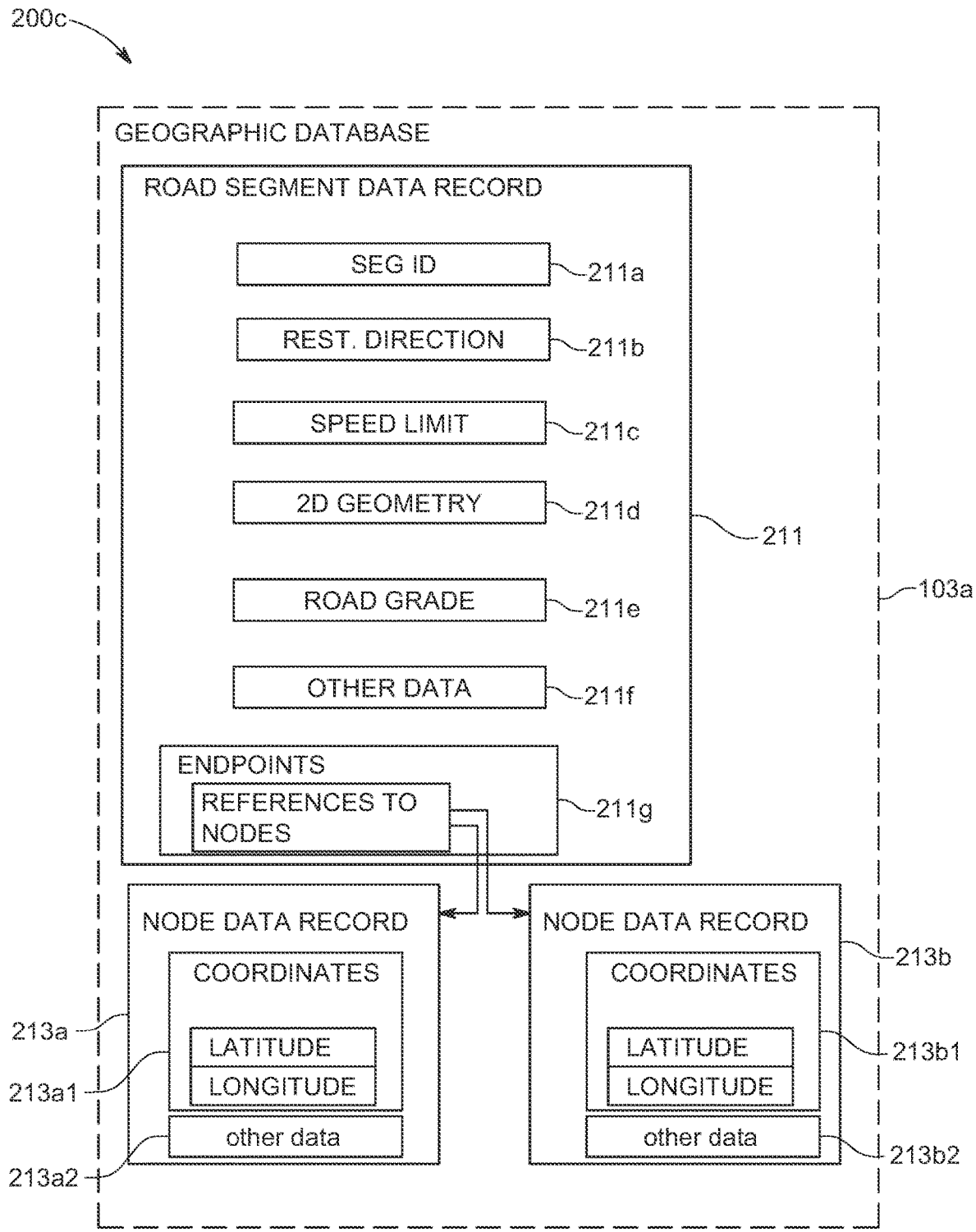
Figure 2D:
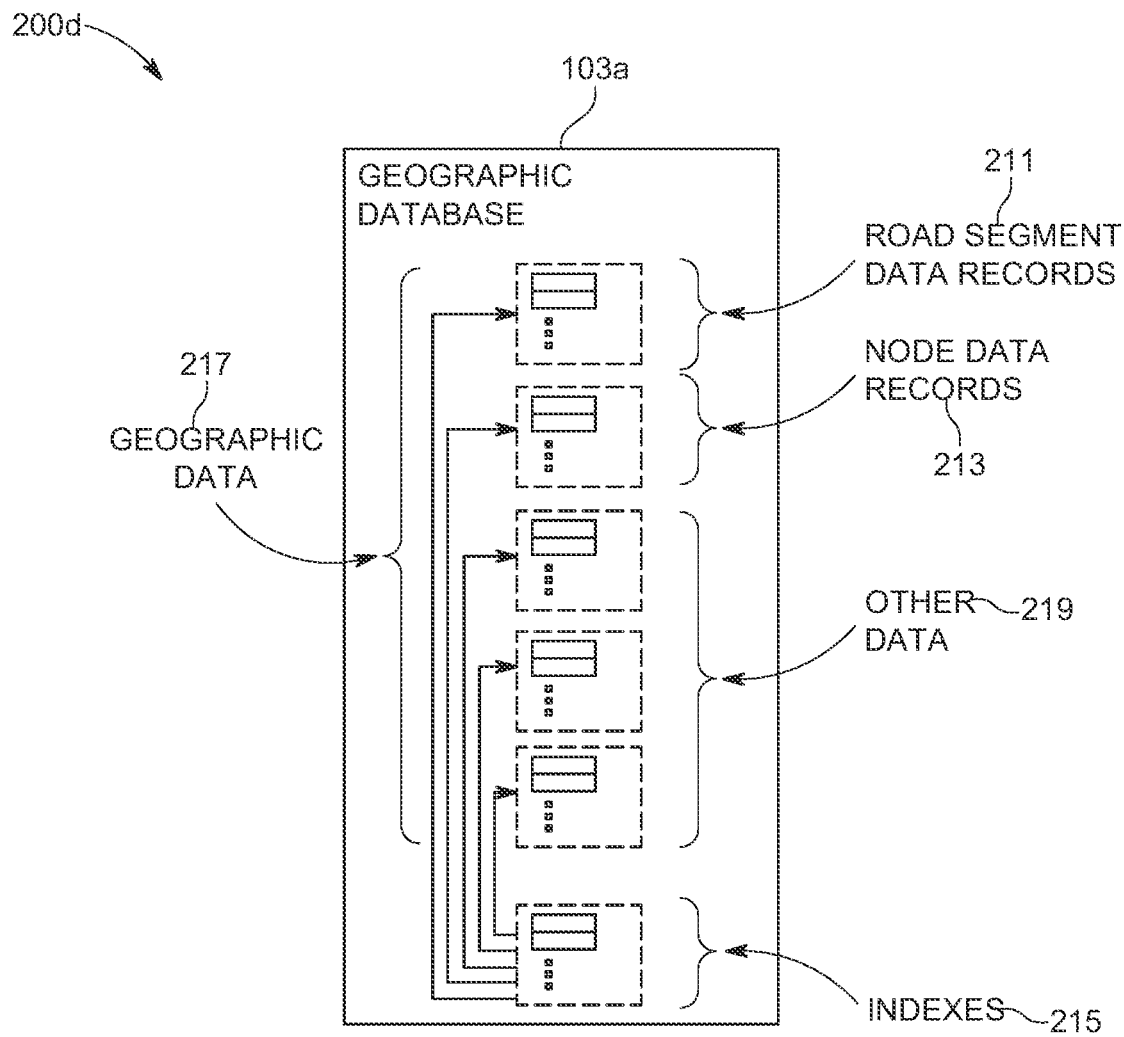
Figure 3:
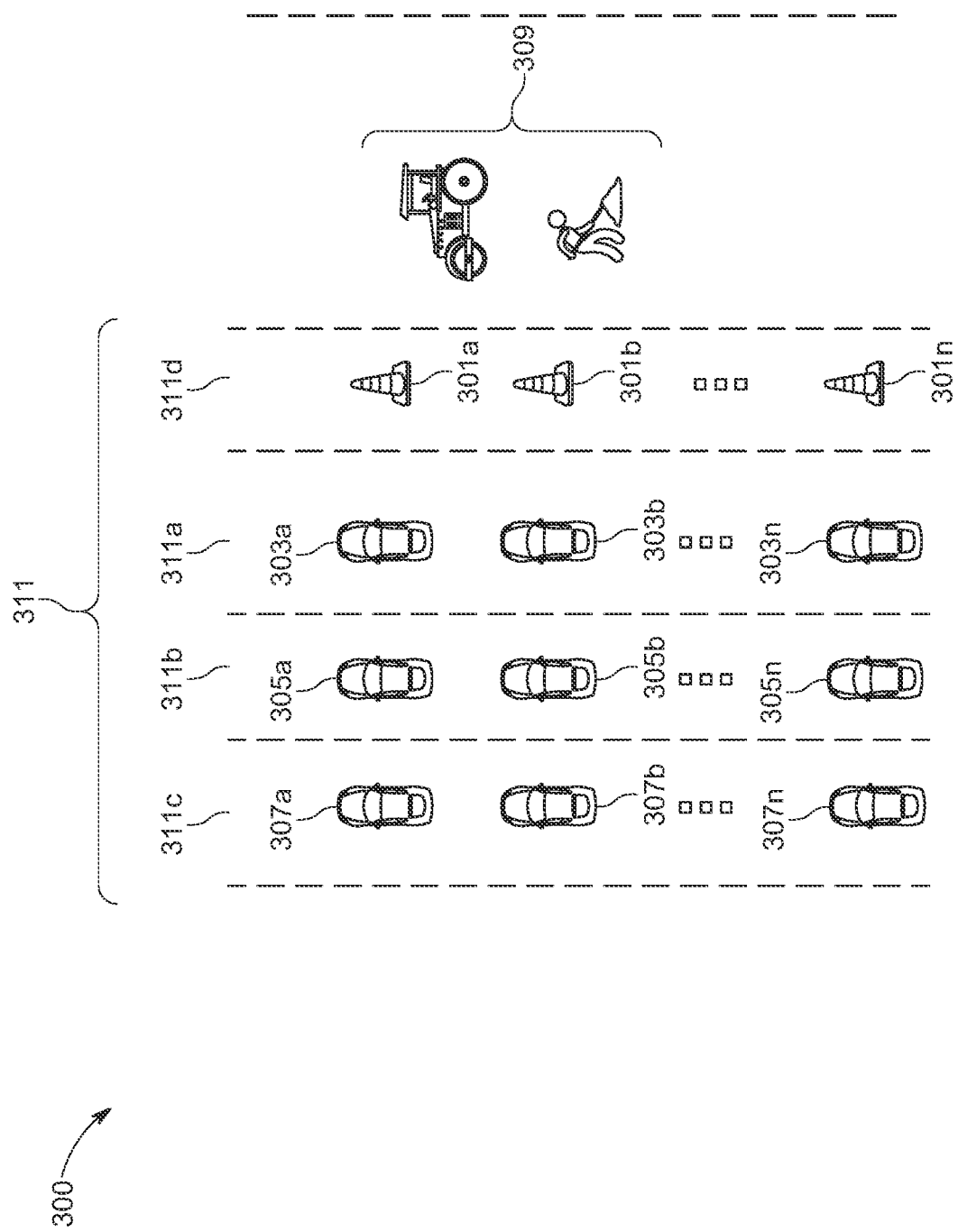
Figure 4:
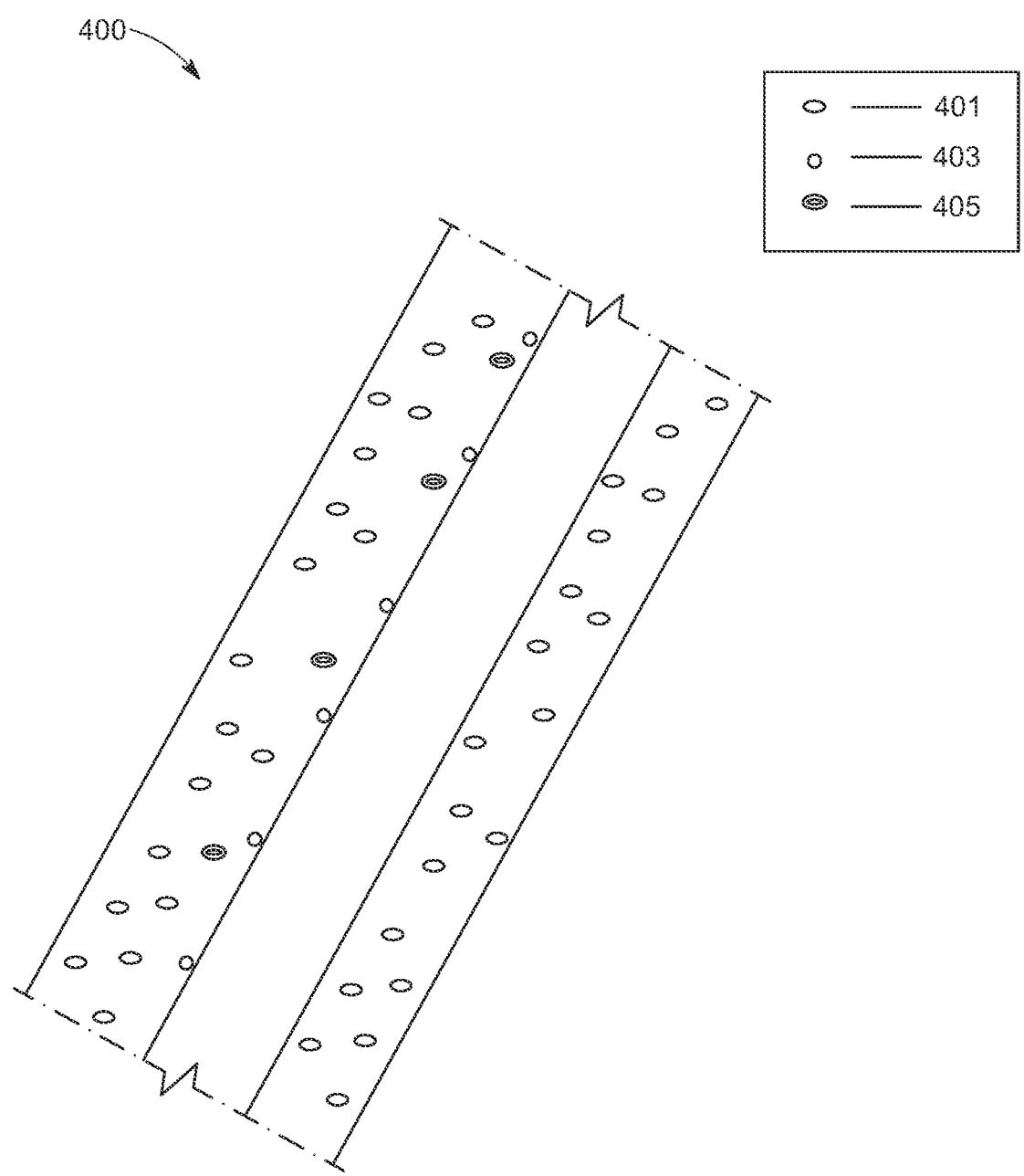
Figure 5:
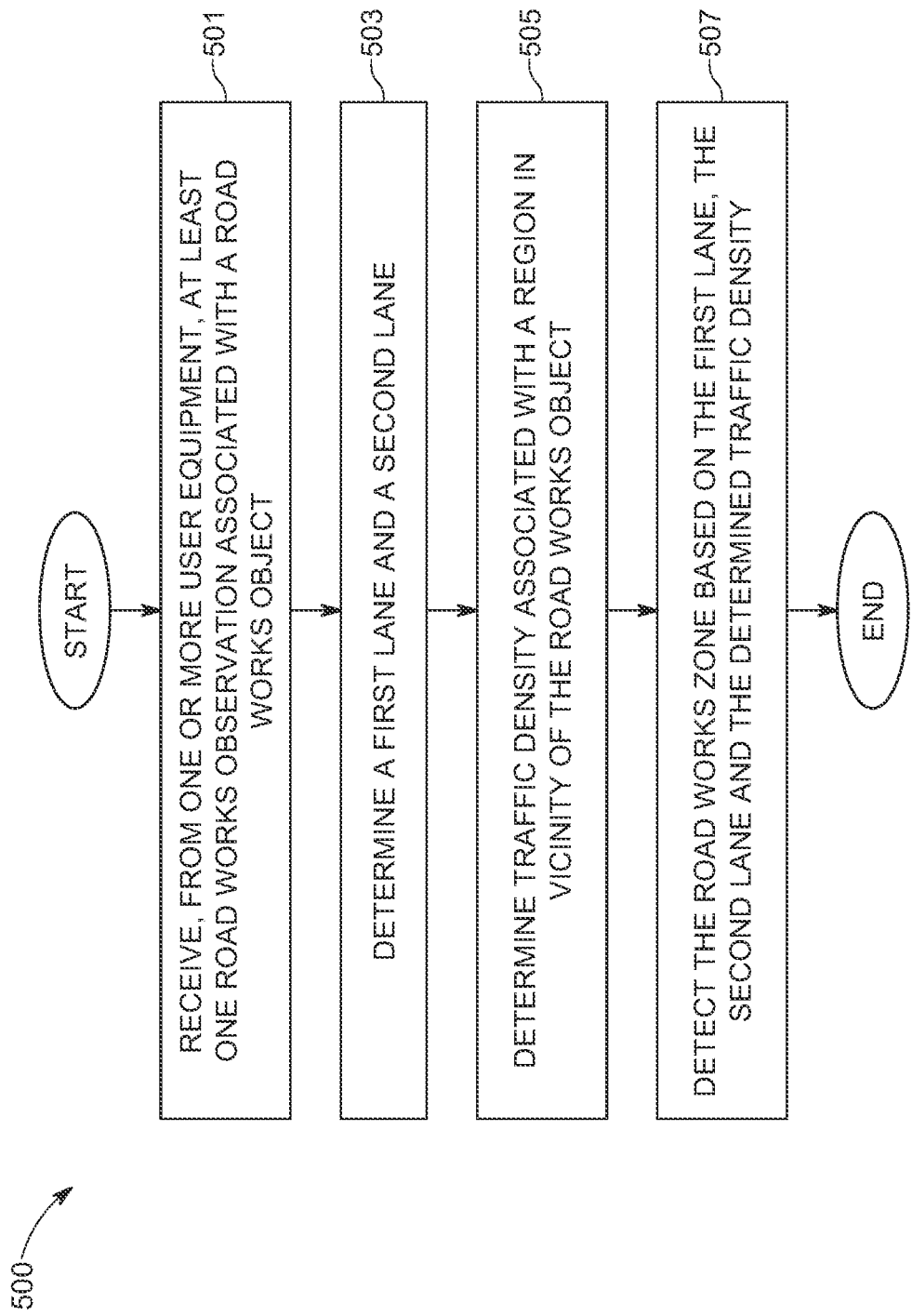
Figure 6:
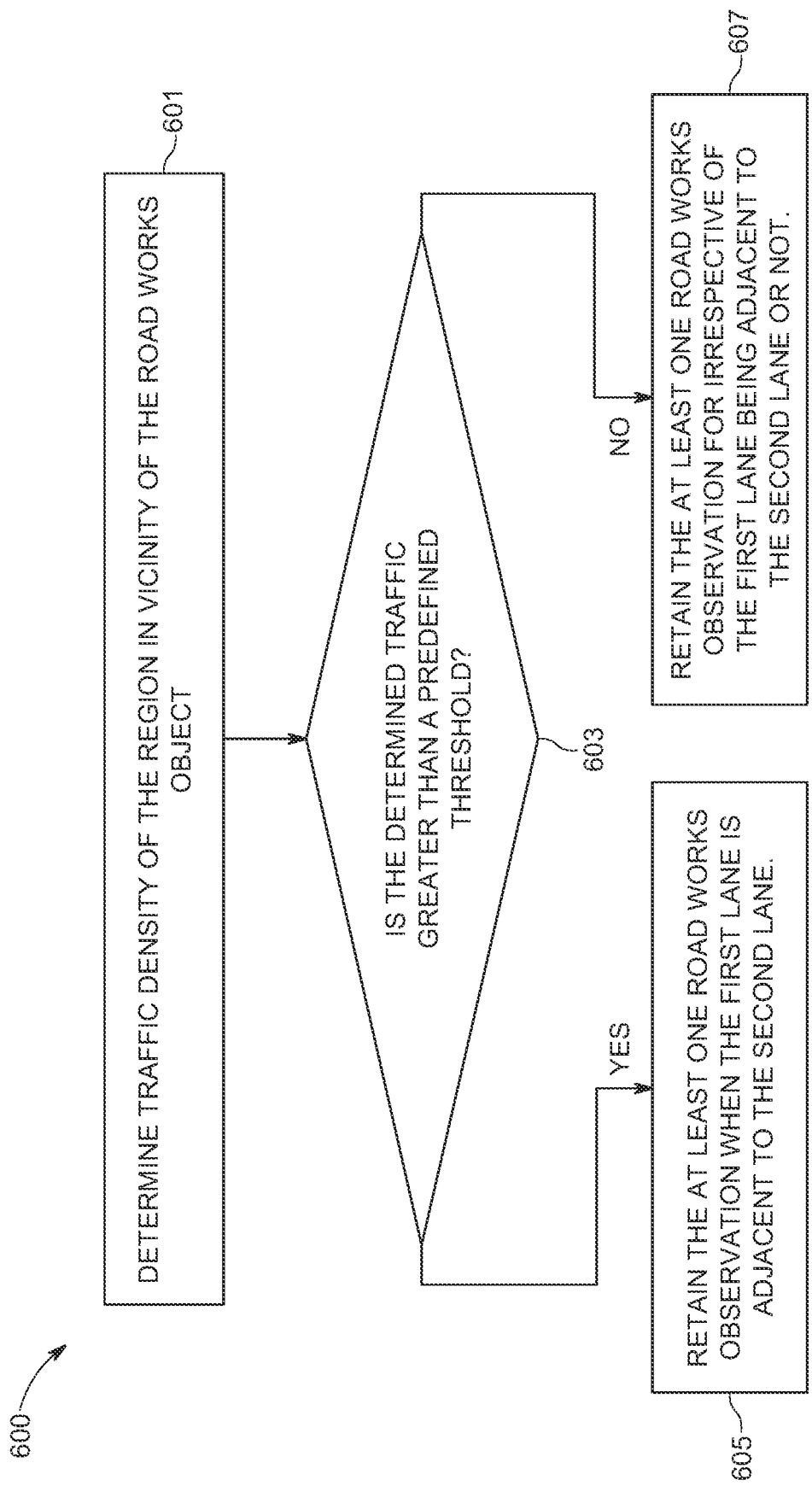

Having thus described example embodiments of the invention in general terms, reference will now be made to the accompanying drawings, which are not necessarily drawn to scale, and wherein:

FIG. 1 illustrates a schematic diagram of a network environment of a system for detecting a road works zone, in accordance with an example embodiment;

FIG. 2A illustrates a block diagram of the system of FIG. 1, in accordance with an example embodiment;

FIG. 2B illustrates an exemplary map database record storing data, in accordance with one or more example embodiments;

FIG. 2C illustrates another exemplary map database record storing data, in accordance with one or more example embodiments;

FIG. 2D illustrates another exemplary map database storing data, in accordance with one or more example embodiments;

FIG. 3 illustrates a schematic diagram of a working example of the system of FIG. 2A, in accordance with an example embodiment;

FIG. 4 illustrates an exemplary scenario of a working example of the system for detecting the road works zone, in accordance with an example embodiment;

FIG. 5 illustrates a flow diagram of a method for detecting the road works zone, in accordance with an example embodiment; and FIG. 6 illustrates another flow diagram of a method for detecting the road works zone, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "route" may be used to refer to a path from a source location to a destination location on any link.

The term "autonomous vehicle" may refer to any vehicle having autonomous driving capabilities at least in some conditions. The autonomous vehicle may also be known as a driverless car, robot car, self-driving car, or autonomous car. For example, the vehicle may have zero passengers or passengers that do not manually drive the vehicle, but the vehicle drives and maneuvers automatically. There can also be semi-autonomous vehicles.

End of Definitions

Embodiments of the present disclosure may provide a system, a method, and a computer program product for detecting a road works zone accurately and update it on map data. The map data may be associated with a region, such as a construction/road works site. Generally, an association of the map data with the road works zones such a road works zone and the like may not be up to date. The detection of road works using sensor data is important for autonomous driving. In areas where road works are active, it is expected that an autonomous vehicle will transition to a lower level of autonomy.

Cameras of autonomous vehicles are used to observe the visual indicators of road works such as cones, barrels, construction related signs, bollards, lane marking color, and the like. During high density traffic, vehicles in the outer lane, that is to say, vehicles in lanes more than one lane away from the lane blocked off due to roadworks, do not observe the visual indicators of road works since road work cones and other visual indicators are of much lower height than vehicles and are easily occluded. This causes major problem in road works detection system. As a result, the vehicle performing navigation functions using such an inaccurate map data may lead to unwanted situations such as road accidents, traffic congestions, increased travel time, wastage of vehicle mile and the like. It may be bothersome and unnecessary for users due to a number of reasons. Accordingly, the map data related to the road works object association with the road works zone should be up to date in real time for various navigation applications such as in autonomous driving applications. To that end, it would be advantageous to provide methods and systems for predicting presence data of a road works zone to accurately provide the map data such that the unwanted situations such as road accidents, traffic congestions, and increased travel time may be avoided. The methods and systems disclosed herein facilitate updated navigation instructions related to routing of traffic in the road works zone.

Various embodiments are provided for receiving at least one road works observation associated with the road works object. As used herein, the road works object observation is an observation made by one or more sensors of the vehicle. For instance, the vehicle may be equipped with one or more sensors for determining a location associated with the road works object. The road works object may comprise a speed limit sign, a construction work sign, an accident site object, a road divider, a construction object, a traffic cone, a guardrail, or the like.

In this manner, the methods and systems disclosed herein may provide efficient and user-friendly techniques for detecting a road works zone. Further, in some embodiments, most of the processing is done by a remote server based or cloud-based server, so the user may be able to leverage fast processing and improved storage benefits provided by the systems and methods disclosed herein. Further, data for generating navigation instructions using the methods and systems disclosed herein may be gathered through a number of techniques, such as historical map data usage, real time data from map service providers and the like. Thus, the navigation instructions may be generated based on up-to-date and real time data, providing accurate and reliable navigation services to the users. These and other technical improvements of the invention will become evident from the description provided herein.

The system, the method, and the computer program product facilitating detection of a road works zone are described with reference to FIG. 1 to FIG. 6.

FIG. 1 illustrates a schematic diagram of a network environment 100 of a system 101 for detecting a road works zone, in accordance with an example embodiment. The system 101 may be communicatively coupled to a mapping platform 103, a user equipment 105 and an OEM (Original Equipment Manufacturer) cloud 109, via a network 107. The components described in the network environment 100 may be further broken down into more than one component such as one or more sensors or application in user equipment and/or combined together in any suitable arrangement. Further, it is possible that one or more components may be rearranged, changed, added, and/or removed without deviating from the scope of the present disclosure.

In an example embodiment, the system 101 may be embodied in one or more of several ways as per the required implementation. For example, the system 101 may be embodied as a cloud-based service, a cloud-based application, a remote server-based service, a remote server-based application, a virtual computing system, a remote server platform or a cloud-based platform. As such, the system 101 may be configured to operate outside the user equipment 105. However, in some example embodiments, the system 101 may be embodied within the user equipment 105, for example as a part of an in-vehicle navigation system, a navigation app in a mobile device and the like. In each of such embodiments, the system 101 may be communicatively coupled to the components shown in FIG. 1 to carry out the desired operations and wherever required modifications may be possible within the scope of the present disclosure. The system 101 may be implemented in a vehicle, where the vehicle may be an autonomous vehicle, a semi-autonomous vehicle, or a manually driven vehicle. In an embodiment, the system 101 may be deployed in a consumer vehicle to generate navigation information in a region. Further, in one embodiment, the system 101 may be a standalone unit configured to generate navigation information in the region for the vehicle. Alternatively, the system 101 may be coupled with an external device such as the autonomous vehicle. In some embodiments, the system 101 may be a processing server 103b of the mapping platform 103 and therefore may be co-located with or within the mapping platform 103. In some other embodiments, the system 101 may be an OEM (Original Equipment Manufacturer) cloud, such as the OEM cloud 109. The OEM cloud 109 may be configured to anonymize any data received from the system 101, such as the vehicle, before using the data for further processing, such as before sending the data to the mapping platform 103. In some embodiments, anonymization of data may be done by the mapping platform 103.

The mapping platform 103 may comprise a map database 103a for storing map data and a processing server 103b. The map database 103a may store node data, road segment data, link data, point of interest (POI) data, link identification information, heading value records, data about various geographic zones, regions, pedestrian data for different regions, heatmaps or the like. Also, the map database 103a further includes speed limit data of different lanes, cartographic data, routing data, and/or maneuvering data. Additionally, the map database 103a may be updated dynamically to cumulate real time traffic data. The real time traffic data may be collected by analyzing the location transmitted to the mapping platform 103 by a large number of road users through the respective user devices of the road users. In one example, by calculating the speed of the road users along a length of road, the mapping platform 103 may generate a live traffic map, which is stored in the map database 103a in the form of real time traffic conditions. In an embodiment, the map database 103a may store data of different zones in a region. In one embodiment, the map database 103a may further store historical traffic data that includes travel times, average speeds and probe counts on each road or area at any given time of the day and any day of the year. In an embodiment, the map database 103a may store the probe data over a period of time for a vehicle to be at a link or road at a specific time. The probe data may be collected by one or more devices in the vehicle such as one or more sensors or image capturing devices or mobile devices. In an embodiment, the probe data may also be captured from connected-car sensors, smartphones, personal navigation devices, fixed road sensors, smart-enabled commercial vehicles, and expert monitors observing accidents and construction. In an embodiment, the map data in the map database 103a may be in the form of map tiles. Each map tile may denote a map tile area comprising plurality of road segments or links in it. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network used by vehicles such as cars, trucks, buses, motorcycles, and/or other entities. Optionally, the map database 103a may contain path segment and node data records, such as shape points or other data that may represent pedestrian paths, links, or areas in addition to or instead of the vehicle road record data, for example. The road/link and nodes can be associated with attributes, such as geographic coordinates, street names, address ranges, speed limits, turn restrictions at intersections, and other navigation related attributes. The map database 103a may also store data about the POIs and their respective locations in the POI records. The map database 103a may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103a may include event data (e.g., traffic incidents, construction activities, scheduled events, unscheduled events, accidents, diversions etc.) associated with the POI data records or other records of the map database 103a associated with the mapping platform 103. Optionally, the map database 103a may contain path segment and node data records or other data that may represent pedestrian paths or areas in addition to or instead of the autonomous vehicle road record data.

In some embodiments, the map database 103a may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, navigation instruction generation and other functions, by a navigation device, such as by the user equipment 105. The navigation-related functions may correspond to vehicle navigation, pedestrian navigation, navigation instruction suppression, navigation instruction generation based on user preference data or other types of navigation. The compilation to produce the end user databases may be performed by a party or entity separate from the map developer. For example, a customer of the map developer, such as a navigation device developer or other end user device developer, a navigation app service provider and the like may perform compilation on a received map database in a delivery format to produce one or more compiled navigation databases.

As mentioned above, the map database 103a may be a master geographic database, but in alternate embodiments, the map database 103a may be embodied as a client-side map database and may represent a compiled navigation database that may be used in or with end user equipment such as the user equipment 105 to provide navigation and/or map-related functions. For example, the map database 103a may be used with the user equipment 105 to provide an end user with navigation features. In such a case, the map database 103a may be downloaded or stored locally (cached) on the user equipment 105.

The processing server 103b may comprise processing means, and communication means. For example, the processing means may comprise one or more processors configured to process requests received from the user equipment 105. The processing means may fetch map data from the map database 103a and transmit the same to the user equipment 105 via OEM cloud 109 in a format suitable for use by the user equipment 105. In one or more example embodiments, the mapping platform 103 may periodically communicate with the user equipment 105 via the processing server 103b to update a local cache of the map data stored on the user equipment 105. Accordingly, in some example embodiments, the map data may also be stored on the user equipment 105 and may be updated based on periodic communication with the mapping platform 103.

In some example embodiments, the user equipment 105 may be any user accessible device such as a mobile phone, a smartphone, a portable computer, and the like, as a part of another portable/mobile object such as a vehicle. The user equipment 105 may comprise a processor, a memory, and a communication interface. The processor, the memory and the communication interface may be communicatively coupled to each other. In some example embodiments, the user equipment 105 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example embodiments, the user equipment 105 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 105. Additional, different, or fewer components may be provided. In one embodiment, the user equipment 105 may be directly coupled to the system 101 via the network 107. For example, the user equipment 105 may be a dedicated vehicle (or a part thereof) for gathering data for development of the map data in the database 103a. In some example embodiments, at least one user equipment such as the user equipment 105 may be coupled to the system 101 via the OEM cloud 109 and the network 107. For example, the user equipment 105 may be a consumer vehicle (or a part thereof) and may be a beneficiary of the services provided by the system 101. In some example embodiments, the user equipment 105 may serve the dual purpose of a data gatherer and a beneficiary device. The user equipment 105 may be configured to capture sensor data associated with a road which the user equipment 105 may be traversing. The sensor data may for example be image data of road works objects, road signs, or the surroundings. The sensor data may refer to sensor data collected from a sensor unit in the user equipment 105. In accordance with an embodiment, the sensor data may refer to the data captured by the vehicle using sensors. The user equipment 105, may be communicatively coupled to the system 101, the mapping platform 103 and the OEM cloud 109 over the network 107.

The network 107 may be wired, wireless, or any combination of wired and wireless communication networks, such as cellular, Wi-Fi, internet, local area networks, or the like. In one embodiment, the network 107 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In an embodiment the network 107 is coupled directly or indirectly to the user equipment 105 via the OEM cloud 109. In an example embodiment, the system may be integrated in the user equipment 105. In an example, the mapping platform 103 may be integrated into a single platform to provide a suite of mapping and navigation related applications for OEM devices, such as the user devices and the system 101. The system 101 may be configured to communicate with the mapping platform 103 over the network 107. Thus, the mapping platform 103 may enable provision of cloud-based services for the system 101, such as, updating data about road works zone in the OEM cloud 109 in batches or in real-time.

FIG. 2A illustrates a block diagram 200a of the system 101 for detecting a road works zone, in accordance with an example embodiment. The system 101 may include at least one processor 201 (hereinafter, also referred to as "processor 201"), at least one memory 203 (hereinafter, also referred to as "memory 203"), and at least one communication interface 205 (hereinafter, also referred to as "communication interface 205"). The processor 201 may include a sensor module 201a, a lane detection module 201b, a traffic density detection module 201c and a road works zone detection module 201d. The processor 201 may retrieve computer program code instructions that may be stored in the memory 203 for execution of the computer program code instructions.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

In some embodiments, the processor 201 may be configured to provide Internet-of-Things (IoT) related capabilities to users of the system 101. In some embodiments, the users may be or correspond to an autonomous or a semi-autonomous vehicle. The IoT related capabilities may in turn be used to provide smart navigation solutions by providing real time updates to the users to take pro-active decision on turn-maneuvers, lane changes and the like, big data analysis, traffic redirection, and sensor-based data collection by using the cloud-based mapping system for providing navigation recommendation services to the users. The system 101 may be accessed using the communication interface 205. The communication interface 205 may provide an interface for accessing various features and data stored in the system 101.

Additionally, or alternatively, the processor 201 may include one or more processors capable of processing large volumes of workloads and operations to provide support for big data analysis. In an example embodiment, the processor 201 may be in communication with the memory 203 via a bus for passing information among components coupled to the system 101.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201.

As exemplarily illustrated in FIG. 2A, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

The sensor module 201a may be configured to receive data from one or sensors including but not limited to acoustic sensors such as a microphone array, position sensors such as a GPS sensor, a gyroscope, a LIDAR sensor, a proximity sensor, motion sensors such as accelerometer, an image sensor such as a camera and the like. To that end, the sensor module 201a may be configured to receive at least one road works observation from the user equipment 105. The at least one road works observation may be associated with a road works object. The road works object includes various types of objects that are encountered on a route of travel of the user equipment. For example, when the user equipment 105 is a vehicle, the road works object may be a visual indicator of road works such as a traffic cone, a barrel, a construction related sign, lane marking color road sign, a road works detection sign, a guide rail, and the like. In one embodiment, the camera associated with the vehicle captures the road works object in the form of the road works observation.

To that end, the location detection module 201b is configured to process the at least one road works observation received by the sensor module 201a. Once the sensor data in the form of the road works observation is received by the sensor module 201a, the sensor data is processed to extract information related to a first location associated with the road works observation. For example, when the user equipment 105 is a vehicle, the first location may be associated with the location of the vehicle. The location of the vehicle is obtained from vehicle traces which are reported by the vehicle and are subsequently map matched using a path-based map matcher algorithm or a lane level map matcher algorithm provided by the mapping platform 103.

The location detection module 201b determines a first lane and a second lane using the lane level map matcher algorithm. To that end, the location reported by the vehicle in the road works observation or as the vehicle trace, also referred to as a first location, is map matched to lane level data records of the map database 103a. As a result a corresponding lane associated with each vehicle trace or road works observation sighting location is identified as the corresponding first lane. Thus, the first lane is associated with the at least one road works observation.

Further, to determine the second lane, the location detection module 201b determines a second location by applying one or more positional offsets (lateral, longitudinal, vertical) in meters to the vehicle's position (first location) at the time when the at least one road works observation was made. The one or more positional offsets may be received in the at least one road works observation data, which includes data such as sign recognition data, position estimation data, timestamp data and the like. This produces a new latitude and longitude which represents the second location associated with the road works object. The second location is then map matched using the lane level map matcher algorithm by the location detection module 201b. Further, the second lane is determined by the location detection module 201b as the lane of the road works object in this manner. As is known in conventional art, map matching is a procedure in which the vehicle's position is estimated by matching the global positioning system (GPS) and a reference HD map. A simple map-matching approach tailors the current position of the vehicle, based on the nearest landmarks onto a vector representation of a road network. A lane level map matching method is used for vehicle localization using the GPS and camera on the HD map. The map matching method relies on road link information, which indicates the center of each lane in the HD map. The position of the vehicle is estimated by matching the GPS and the reference HD map.

Further, the traffic density detection module 201c, in the processor 201, may be configured to determine the vehicle density at the road works location (road works zone). This can be done through real time traffic feed, traffic volume estimations, probe counts, etc. Furthermore, the density of vehicles can be determined using the cameras of the road works observation reporting user equipment. For vehicle density determination, the analysis can be done in the cloud, that is to say in the mapping platform 103, which may be implemented as a cloud-based server. The images from the vehicle are sent to the cloud and the traffic density at the road works location is determined in the cloud using computer vision analysis on the received images. Computer vision techniques are applied for determining traffic density. Using computer vision the number of vehicles within a unit distance may be determined by the traffic density detection module 201c. In some alternated embodiments, the computer vision analysis may be done at the user equipment 105, but it may be not computationally efficient.

Further, based on the determined traffic density, the road works zone may be detected by the road works zone detection module 201d. The road works zone detection module 201d may include a remote server, a cloud-based server, and a map database. The cloud-based server may be an OEM (Original Equipment Manufacturer) cloud, such as the OEM cloud 109 or it may be mapping platform 103. The road works zone detection module 201d may be configured to compare the determined traffic density of the road works zone with a predefined threshold. The road works zone detection module 201d may be configured to filter the at least one road works observation associated with the road works object based on the comparison.

The road works zone detection module 201d may assign a weight to the at least one road works observation based on the comparison of the determined traffic density with a predefined threshold, the first lane, and the second lane. Further, to filter the at least one road works observation, road works zone detection module 201d is further configured to retain the at least one road works observation for detection of the road works zone when the first lane is adjacent to the second lane, based on determining that the determined traffic density of the region is above the predefined threshold.

In some example embodiments, to filter the at least one road works observation, road works zone detection module 201d is further configured to retain the at least one road works observation for detection of the road works zone irrespective of the first lane being adjacent to the second lane or not, based on determining that the determined traffic density of the region is below the predefined threshold.

The road works zone detection module 201d is further configured to assign a weight to the at least one road works observation based on the comparison, the first lane, and the second lane. The weight is proportional to a distance between the first lane and the second lane when the comparison indicates that the determined traffic density is more than the predefined threshold. In some example embodiment of the present disclosure, the road works zone detection module 201d is configured to assign a first weight value to the at least one road works observation, when the first lane is adjacent to the second lane, assign a second weight value to the at least one road works observation, when the first lane is farther than a lane adjacent to the second lane, such that the second weight value is lesser than the first weight value. The road works zone detection module 201d is further configured to assign a constant weight to the at least one road works observation when the determined traffic density is lesser than the predefined threshold. Thus, the road works zone is updated accurately on map data in real time, for accurate navigation applications.

The road works zone detection module 201d further configured to update a map database based on the detection of the road works zone. Further, the road works zone detection module 201d configured to generate one or more navigation instructions for the one or more user equipment based on the detection of the road works zone. The updated map data may then be used for further communication in navigation applications involving the system 101, by suitable access mechanisms provided by the communication interface 205 module.

The communication interface 205 may comprise input interface and output interface for supporting communications to and from the user equipment 105 or any other component with which the system 101 may communicate. The communication interface 205 may be any means such as a device or circuitry embodied in either hardware or a combination of hardware and software that is configured to receive and/or transmit data to/from a communications device in communication with the user equipment 105. In this regard, the communication interface 205 may include, for example, an antenna (or multiple antennae) and supporting hardware and/or software for enabling communications with a wireless communication network. Additionally, or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms for enabling the system 101 to carry out information exchange functions in many different forms of communication environments. The communication interface enables exchange of information and instructions for detecting road works zone and updating it on map data stored in the map database 103a.

FIG. 2B shows format of the map data 200b stored in the map database 103a according to one or more example embodiments. FIG. 2B shows a link data record 207 that may be used to store data about one or more of the feature lines. This link data record 207 has information (such as "attributes", "fields", etc.) associated with it that allows identification of the nodes associated with the link and/or the geographic positions (e.g., the latitude and longitude coordinates and/or altitude or elevation) of the two nodes. In addition, the link data record 207 may have information (e.g., more "attributes", "fields", etc.) associated with it that specify the permitted speed of travel on the portion of the road represented by the link record, the direction of travel permitted on the road portion represented by the link record, what, if any, turn restrictions exist at each of the nodes which correspond to intersections at the ends of the road portion represented by the link record, the street address ranges of the roadway portion represented by the link record, the name of the road, and so on. The various attributes associated with a link may be included in a single data record or are included in more than one type of record which are referenced to each other.

Each link data record that represents another-than-straight road segment may include shape point data. A shape point is a location along a link between its endpoints. To represent the shape of other-than-straight roads, the mapping platform 103 and its associated map database developer selects one or more shape points along the other-than-straight road portion. Shape point data included in the link data record 207 indicate the position, (e.g., latitude, longitude, and optionally, altitude or elevation) of the selected shape points along the represented link.

Additionally, in the compiled geographic database, such as a copy of the map database 103a, there may also be a node data record 209 for each node. The node data record 209 may have associated with it information (such as "attributes", "fields", etc.) that allows identification of the link(s) that connect to it and/or its geographic position (e.g., its latitude, longitude, and optionally altitude or elevation).

In some embodiments, compiled geographic databases are organized to facilitate the performance of various navigation-related functions. One way to facilitate performance of navigation-related functions is to provide separate collections or subsets of the geographic data for use by specific navigation-related functions. Each such separate collection includes the data and attributes needed for performing the particular associated function but excludes data and attributes that are not needed for performing the function. Thus, the map data may be alternately stored in a format suitable for performing types of navigation functions, and further may be provided on-demand, depending on the type of navigation function.

FIG. 2C shows another format of the map data 200c stored in the map database 103a according to one or more example embodiments. In the FIG. 2C, the map data 200c is stored by specifying a road segment data record 211. The road segment data record 211 is configured to represent data that represents a road network. In FIG. 2C, the map database 103a contains at least one road segment data record 211 (also referred to as "entity" or "entry") for each road segment in a geographic region.

The map database 103a that represents the geographic region of FIG. 2A also includes a database record 213 (a node data record 213a and a node data record 213b) (or "entity" or "entry") for each node associated with the at least one road segment shown by the road segment data record 211. (The terms "nodes" and "segments" represent only one terminology for describing these physical geographic features and other terminology for describing these features is intended to be encompassed within the scope of these concepts). Each of the node data records 213a and 213b may have associated information (such as "attributes", "fields", etc.) that allows identification of the road segment(s) that connect to it and/or its geographic position (e.g., its latitude and longitude coordinates).

FIG. 2C shows some of the components of the road segment data record 211 contained in the map database 103a. The road segment data record 211 includes a segment ID 211a by which the data record can be identified in the map database 103a. Each road segment data record 211 has associated with it information (such as "attributes", "fields", etc.) that describes features of the represented road segment. The road segment data record 211 may include data 211b that indicate the restrictions, if any, on the direction of vehicular travel permitted on the represented road segment. The road segment data record 211 includes data 211c that indicate a static speed limit or speed category (i.e., a range indicating maximum permitted vehicular speed of travel) on the represented road segment. The static speed limit is a term used for speed limits with a permanent character, even if they are variable in a pre-determined way, such as dependent on the time of the day or weather. The static speed limit is the sign posted explicit speed limit for the road segment, or the non-sign posted implicit general speed limit based on legislation.

The road segment data record 211 may also include data 211d indicating the two-dimensional ("2D") geometry or shape of the road segment. If a road segment is straight, its shape can be represented by identifying its endpoints or nodes. However, if a road segment is other-than-straight, additional information is required to indicate the shape of the road. One way to represent the shape of an other-than-straight road segment is to use shape points. Shape points are points through which a road segment passes between its end points. By providing the latitude and longitude coordinates of one or more shape points, the shape of an other-than-straight road segment can be represented. Another way of representing other-than-straight road segment is with mathematical expressions, such as polynomial splines.

The road segment data record 211 also includes road grade data 211e that indicate the grade or slope of the road segment. In one embodiment, the road grade data 211e include road grade change points and a corresponding percentage of grade change. Additionally, the road grade data 211e may include the corresponding percentage of grade change for both directions of a bi-directional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 211e includes the road grade change points and an actual road grade value for the portion of the road segment after the road grade change point until the next road grade change point or end node. In a further embodiment, the road grade data 211e includes elevation data at the road grade change points and nodes. In an alternative embodiment, the road grade data 211e is an elevation model which may be used to determine the slope of the road segment.

The road segment data record 211 also includes data 211g providing the geographic coordinates (e.g., the latitude and longitude) of the end points of the represented road segment. In one embodiment, the data 211g are references to the node data records 211 that represent the nodes corresponding to the end points of the represented road segment.

The road segment data record 211 may also include or be associated with other data 211f that refer to various other attributes of the represented road segment. The various attributes associated with a road segment may be included in a single road segment record or may be included in more than one type of record which cross-reference each other. For example, the road segment data record 211 may include data identifying the name or names by which the represented road segment is known, the street address ranges along the represented road segment, and so on.

FIG. 2C also shows some of the components of the node data record 213 contained in the map database 103a. Each of the node data records 213 may have associated information (such as "attributes", "fields", etc.) that allows identification of the road segment(s) that connect to it and/or it's geographic position (e.g., its latitude and longitude coordinates). For the embodiment shown in FIG. 2C, the node data records 213a and 213b include the latitude and longitude coordinates 213a1 and 213b1 for their nodes. The node data records 213a and 213b may also include other data 213a2 and 213b2 that refer to various other attributes of the nodes.

Thus, the overall data stored in the map database 103a may be organized in the form of different layers for greater detail, clarity, and precision. Specifically, in the case of high-definition maps, the map data may be organized, stored, sorted, and accessed in the form of three or more layers. These layers may include road level layer, lane level layer and localization layer. The data stored in the map database 103a in the formats shown in FIGS. 2B and 2C may be combined in a suitable manner to provide these three or more layers of information. In some embodiments, there may be lesser or fewer number of layers of data also possible, without deviating from the scope of the present disclosure.

FIG. 2D illustrates a block diagram 200d of the map database 103a storing map data or geographic data 217 in the form of road segments/links, nodes, and one or more associated attributes as discussed above. Furthermore, attributes may refer to features or data layers associated with the link-node database, such as an HD lane data layer.

In addition, the map data 217 may also include other kinds of data 219. The other kinds of data 219 may represent other kinds of geographic features or anything else. The other kinds of data may include point of interest data. For example, the point of interest data may include point of interest records comprising a type (e.g., the type of point of interest, such as restaurant, ATM, etc.), location of the point of interest, a phone number, hours of operation, etc. The map database 103a also includes indexes 215. The indexes 215 may include various types of indexes that relate the different types of data to each other or that relate to other aspects of the data contained in the geographic database 103a.

The data stored in the map database 103a in the various formats discussed above may help in provide precise data for high-definition mapping applications, autonomous vehicle navigation and guidance, cruise control using ADAS, direction control using accurate vehicle maneuvering and other such services. In some embodiments, the system 101 accesses the map database 103a storing data in the form of various layers and formats depicted in FIGS. 2B-2D.

FIG. 3 illustrates a schematic diagram of a working example 300 of the system, in accordance with an example embodiment. FIG. 3 may include a plurality of road works objects 301a, 301b, . . . 301n, a first set of plurality of vehicles 303a, 303b, . . . 303n, a second set of plurality of vehicles 305a, 305b, . . . 305n, a third set of plurality of vehicles 307a, 307b, . . . 307n, a road works zone 309, a link 311, a lane 311a, a lane 311b, a lane 311c and a lane 311d. The plurality of vehicles may be an autonomous vehicle, a semiautonomous vehicle, or a manual vehicle. In various embodiments, the plurality of vehicles may be equipped with sensors for generating or collecting vehicular sensor data (also referred to as sensor data), related geographic/map data, etc. The plurality of road works objects 301a, 301b, . . . 301n include various types of objects that are encountered on a route of travel of the user equipment 105. For example, when the user equipment 105 is a vehicle, the plurality of road works objects 301a, 301b, . . . 301n may be visual indicators of road works such as a traffic cone, a barrel, a construction related sign, lane marking color road sign, a road works detection sign, a guide rail, and the like. According to some embodiments, the sensors may comprise image capture sensors configured to capture images of the plurality of road works objects 301a, 301b, . . . 301n along the link 311. In accordance with an embodiment, the system 101 may be configured to extract information related to a first location associated with the road works observation. For example, when the user equipment 105 is a vehicle, the first location may be associated with the location of the vehicle. In FIG. 3, the first location may be associated with the first, second and third set of plurality of vehicles.

Once, when the sensors of the vehicles reports the first location associated with the road works observation (for instance, the location of the vehicle) and a second location associated with the plurality of road works objects 301a, 301b, . . . 301n, the system 101 may be triggered to predict presence of the road works zone 309 associated with the plurality of road works objects 301a, 301b, . . . 301n. In other words, the system 101 may be triggered to predict whether the reported plurality of road works objects 301a, 301b, . . . 301n, are in the road works zone 309 or not or are detected or not and correspondingly detect the road works zone 309, when the system 101 receives the location associated with the plurality of road works objects 301a, 301b, . . . 301n. The road works zone defines a region which is blocked for traffic movement due to ongoing roadworks. Roadworks occur when part of the road, or in rare cases, the entire road, has to be occupied for work relating to the road, most often in the case of road surface repairs. The road works zone may have a start location and an end location which marks correspondingly the start and the end of the road works zone. During high density traffic in the road works zone, the vehicles in the outer lanes such as 305 or 307 do not observe the road works objects such road work cones, and other visual indicators are of much lower height than vehicles and they are easily occluded by other vehicles.

In accordance with an example embodiment, the location detection module 201b determines the second location associated with the road works object such as 301a. It applies equally to all/each road works object in the same manner. The second location is determined by applying the position offsets (lateral, longitudinal, vertical) in meters to the vehicle's position (first location) at the time and when the road works observations were made. This produces a new latitude and longitude which represents the second location associated with the road works object. For example, in FIG. 3, the second location may be associated with the location of the road works object 301a. The location detection module 201b is further configured to determine the lane associated with 301a and a lane associated with each of the plurality of vehicles. The lane associated with each of the plurality of vehicles such as 303, 305 or 307 is determined to be a first lane. The first lane is associated with the one or more user equipment such as vehicles, capturing the at least one road works observation. The lane associated with the 301a is determined to be a second lane, in accordance with an example embodiment. In accordance with an example embodiment, vehicle density is determined by the system 101. Furthermore, the density of vehicles can be determined using the cameras of the road works observation reporting user equipment. Computer vision techniques are applied for determining traffic density. Using computer vision the number of vehicles within a unit distance may be determined by the traffic density detection module 201c. In accordance with another example embodiment, the system 101 may compare the determined traffic density of the region with a predefined threshold. Further, the system 101 may filter the at least one road works observation associated with the road works object based on the comparison.

The system 101 may assign a weight to the at least one road works observation based on the comparison of the determined traffic density with a predefined threshold, the first lane, and the second lane. Further, to filter the at least one road works observation, the system 101 is further configured to retain the at least one road works observation for detection of the road works zone when the first lane is adjacent to the second lane, based on determining that the determined traffic density of the region is above the predefined threshold. For example, In FIG. 3 the first lane for example the first lane 311a, associated with a vehicle 303a is adjacent to the lane 301d, associated with the road works object 301a. So for the vehicles adjacent to the lane of road works objects, the road works objects will be clearly visible even in high density traffic. So, for the vehicles in lane adjacent to the lane of road works objects, the at least one road works observation is retained in the map database for detection of the road works zone.

In some example embodiments, to filter the at least one road works observation, the system 101 is further configured to retain the at least one road works observation for detection of the road works zone irrespective of the first lane being adjacent to the second lane or not, based on determining that the determined traffic density of the region is below the predefined threshold. When the determined traffic density of the region is below the predefined threshold, the road works objects (visual indicators of road work zone) are not occluded by other vehicles. To that end, the at least one road works observation associated with the vehicle is retained by the system 101, irrespective of the first lane being adjacent to the second lane or not.

According to an example embodiment of the present disclosure, the system 101 is further configured to assign a weight to the at least one road works observation based on the comparison, the first lane, and the second lane. The weight is proportional to a distance between the first lane and the second lane when the comparison indicates that the determined traffic density is more than the predefined threshold. In some example embodiment of the present disclosure, the system 101 is configured to assign a first weight value to the at least one road works observation, when the first lane is adjacent to the second lane. For example, in FIG. 3, a first weight value to the at least one road works observation associated with a vehicle 303a. The vehicle 303a is in the first lane 311a, which is adjacent to the lane 311d, the lane of the road works object 301a.

According to an example embodiment of the present disclosure, the system 101 may assign a second weight value to the at least one road works observation, when the first lane is farther than a lane adjacent to the second lane, such that the second weight value is lesser than the first weight value. For example, in FIG. 3, a second weight value is assigned to the at least one road works observation associated with a vehicle 307a. The vehicle 307a is in the first lane 311c, which is not adjacent to the lane 311d, the lane of the road works object 301a. Similarly, the vehicle 305a is in the first lane 311b, which is not adjacent to the lane 311d. So the road works observation associated with vehicles in a lane farther than a lane adjacent to the lane of road works object, are assigned a lesser weight as they cannot accurately predict the presence of the road works zone due to occlusion of the road works objects by other vehicles. While for the vehicles in a lane adjacent to the lane of the road works object, the road works objects are clearly visible despite the high-density traffic.

According to an example embodiment of the present disclosure, the system 101 may is further configured to assign a constant weight to the at least one road works observation when the determined traffic density is lesser than the predefined threshold. Thus, the road works zone is updated accurately on map data in real time, for accurate navigation applications.

The exemplary scenario of the system 101 is further described in FIG. 4.

FIG. 4 illustrates an exemplary scenario of a working example of the system for detecting the road works zone, in accordance with an example embodiment. FIG. 4 includes "construction no" data 401, "ground truth" data 403, "construction yes" data 405. FIG. 4 represents examples of road works sensor data and road works ground truth in presence of high-density traffic. The "ground truth" data 403 represents the location where construction work is present. In a working example scenario, the vehicles running in a lane adjacent to the ground truth, reported "construction yes" data 405. The vehicles running in a lane furthest to the ground truth, reported "construction no" data 401. The vehicles running in a lane furthest to the construction site, may not identify visual indicators of road work because the visual indicators are occluded be other vehicles. Such that, the vehicles running in a lane furthest to the construction site report incorrect data for detection of road works zone.

FIG. 5 illustrates a flow diagram of a method for detecting the road works zone, in accordance with an example embodiment. It will be understood that each block of the flow diagram of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 500 illustrated by the flowchart diagram of FIG. 5 is detecting a road works zone. Fewer, more, or different steps may be provided.

At step 501, the method 500 comprises instructions to receive, from one or more user equipment, at least one road works observation associated with a road works object. The at least one road works observation may be received in form of a sensor data. The sensor data may for example be image data of road works objects, road signs, or the surroundings. In accordance with an embodiment, the sensor data may refer to the data captured by the vehicle using sensors. As discussed in FIG. 1, the user equipment 105 may be a dedicated vehicle (or a part thereof) for gathering data for detection of the road works zone. Additionally, the user equipment 105 may be any user accessible device such as a mobile phone, a smartphone, a portable computer, and the like, as a part of another portable/mobile object such as a vehicle. A road works object may be any road sign. Road works objects give information about the road conditions ahead, provide instructions to be followed at the major crossroads or junctions, warn, or guide drivers, and ensure proper functioning of road traffic. According to an example embodiment of the present disclosure, the road works object may be a visual indicator of road works such as a traffic cone, a barrel, a construction related sign, lane marking color road sign, a road works detection sign, a guide rail, and the like.

At step 503, the method 500 comprises instructions to determine a first lane and a second lane. The first lane is associated with the one or more user equipment capturing the at least one road works observation and the second lane is associated with the road works object. The second lane corresponds to the location of the user equipment 105 at the time of road works object observation. The system 101 may determine the first lane and the second lane by determining a first location and a second location. The first location is associated with the at least one road works observation. The first location is a location of the corresponding user equipment at a time of capturing the road works observation. The second location is associated with the road works object. The first location is then map matched to identify the first lane and the second location is map matched to identify the second lane.

At step 505, the method 500 comprises instructions to determine traffic density associated with a region in vicinity of the road works object. The traffic density detection module 201c, in the processor 201, may be configured to determine the vehicle density at a region in vicinity of the road works object. This can be done through real time traffic feed, traffic volume estimations, probe counts, etc. Furthermore, the density of vehicles can be determined using the cameras of the road works observation reporting user equipment. To determine the traffic density, computer vision analysis is done on image data associated with a plurality of road works observations of road works in the region. This step is further explained in FIG. 6.

At step 507, the method 500 comprises instructions to detect the road works zone based on the first lane, the second lane and the determined traffic density. For detecting the road works zone and updating it on the map data, the determined traffic density is compared with a predefined threshold. The result of the comparison is then analyzed by the system 101. The system may be then configured to filter the at least one road works observation associated with the road works object based on the comparison. Based on determining that the determined traffic density of the region is above the predefined threshold, the system 101 is further configured to retain the at least one road works observation for detection of the road works zone when the first lane is adjacent to the second lane.

According to an example embodiment of the present disclosure, based on determining that the determined traffic density of the region is below the predefined threshold, the system 101 is further configured to retain the at least one road works observation for detection of the road works zone irrespective of the first lane being adjacent to the second lane or not.

After analyzing the result of the comparison, the road works zone is then detected by the system 101 and updated on a map database based on the detection of the road works zone. The system 101 is further configured to generate one or more navigation instructions for the one or more user equipment based on the detection of the road works zone this step is described in detail in FIG. 6.

In this manner, the method 500 may be configured to enable navigation of vehicles in a real-time and reliable manner. The method 500 may be implemented using corresponding circuitry. For example, the method 500 may be implemented by an apparatus or system comprising a processor, a memory, and a communication interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 500.

In an example embodiment, an apparatus for performing the method 500 of FIG. 5 above may comprise a processor (e.g., the processor 201) configured to perform some or each of the operations of the method 500. The processor may, for example, be configured to perform the operations (501-507) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (501-507) may comprise, for example, the processor 201 which may be implemented in the system 101 and/or a device or circuit for executing instructions or executing an algorithm for processing information as described above.

FIG. 6 illustrates another flow diagram of a method 600 for detecting the road works zone, in accordance with an example embodiment. At step 601, the method 600 comprises instructions to determine traffic density of the region in vicinity of the road works object. The traffic density detection module 201c, in the processor 201, may be configured to determine the vehicle density of the region in vicinity of the road works object. This can be done through real time traffic feed, traffic volume estimations, probe counts, etc. Furthermore, the density of vehicles can be determined using the cameras of the road works observation reporting user equipment. Computer vision techniques are also applied for determining traffic density. Using computer vision techniques, the number of vehicles per unit distance may be calculated by the system 101. At step 603, the method comprises instructions to compare the determined traffic density of the road works zone with a predefined threshold. The result of comparison is then analyzed by the system 101 based on the first lane, the second lane and the comparison. As discussed in previous paragraphs, the first lane is associated with the one or more user equipment capturing the at least one road works observation and the second lane is associated with the road works object. At step 605, the method comprises instructions to retain the at least one road works observation when the first lane is adjacent to the second lane, in response to determining that the traffic density value being more than the threshold value. To filter the at least one road works observation the system 101 may be configured to assign a weight to the at least one road works observation based on the comparison, the first lane, and the second lane. When the comparison indicates that the determined traffic density is more than the predefined threshold, the weight is proportional to a distance between the first lane and the second lane. When the comparison indicates that the determined traffic density is more than the predefined threshold, the system 101 is configured to assign a first weight value to the at least one road works observation, when the first lane is adjacent to the second lane. The system 101 may assign a second weight value to the at least one road works observation, when the first lane is farther than a lane adjacent to the second lane, such that the second weight value is lesser than the first weight value.

At step 607, the method comprises instructions to retain the at least one road works observation for detection of the road works zone irrespective of the first lane being adjacent to the second lane or not, in response to determining that the traffic density value being less than the threshold value. The system 101 may assign a constant weight to the at least one road works observation when the determined traffic density is lesser than the predefined threshold. When the determined traffic density is less than the predefined threshold, then vehicle density is low in the road works zone. So the visual indicators of the road works zone are not occluded by other vehicles and are clearly visible to the vehicles of outer lanes.

In this way, example embodiments of the disclosure results in detecting a road works zone. The present disclosure also provides detecting the road works zone that may be associated with a region, such as a construction site. The detection of road works using sensor data is important for autonomous driving. In areas where road works are active, it is expected that an autonomous vehicle will transition to a lower level of autonomy. Cameras of autonomous vehicles are used to observe the visual indicators of road works such as cones, barrels, construction related signs, bollards, lane marking color, and the like. During high density traffic, vehicles in the outer lane do not observe the visual indicators of road works since road work cones and other visual indicators are of much lower height than vehicles and are easily occluded. This causes major problem in road works detection system.

As a result, the vehicle performing navigation functions using such an inaccurate map data may lead to unwanted situations such as road accidents, traffic congestions, increased travel time, wastage of vehicle mile and the like. It may be bothersome and unnecessary for users due to a number of reasons. Accordingly, the map data related to the road works object association with the road works zone should be up to date in real time for various navigation applications such as in autonomous driving applications. To that end, the present disclosure provides methods and systems for predicting presence data of a road works zone to accurately provide the map data such that the unwanted situations such as road accidents, traffic congestions, and increased travel time may be avoided.

In this manner, the present disclosure provides efficient and user-friendly techniques for updating navigation instructions. The present disclosure facilitates updated navigation instructions related to routing of traffic in the road works zone. Along with this, in some embodiments, most of the processing is done by a remote server based or cloud-based server, so the end user may be able to leverage fast processing and improved storage benefits provided by the present disclosure. Thus, the navigation instructions may be generated based on up-to-date and real time data, providing accurate and reliable navigation services to the end users.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for improving an accuracy of detecting a road works zone by mitigating sensor occlusion, the system comprising:
    a memory configured to store computer-executable instructions; and
    at least one processor configured to execute the computer-executable instructions to:
        receive, from one or more sensors of one or more user equipment, at least one road works observation associated with a road works object;

determine a first lane and a second lane, wherein the first lane is associated with the one or more user equipment capturing the at least one road works observation and the second lane is associated with the road works object, wherein the determining of the first lane and the second lane comprises one or more map matching techniques based on respective locations of the one or more user equipment and of the road works object;

determine traffic density associated with a region in vicinity of the road works object;

compare the determined traffic density of the region with a predefined threshold;

filter the at least one road works observation associated with the road works object based on the comparison;

detect the road works zone based on the first lane, the second lane and the determined traffic density; and assign a weight to the at least one road works observation based on the comparison, the first lane, and the second lane, wherein the weight is proportional to a distance between the first lane and the second lane based on the comparison indicating that the determined traffic density is more than the predefined threshold.

2. The system of claim 1, wherein to filter the at least one road works observation, the at least one processor is further configured to:

based on determining that the determined traffic density of the region is above the predefined threshold, retain the at least one road works observation for detection of the road works zone when the first lane is adjacent to the second lane.

3. The system of claim 1, wherein to filter the at least one road works observation, the at least one processor is further configured to:

based on determining that the determined traffic density of the region is below or equal the predefined threshold, retain the at least one road works observation for detection of the road works zone irrespective of the first lane being adjacent to the second lane or not.

4. The system of claim 1, wherein the at least one processor is configured to:

assign a first weight value to the at least one road works observation, when the first lane is adjacent to the second lane;

assign a second weight value to the at least one road works observation, when the first lane is farther than a lane adjacent to the second lane, such that the second weight value is lesser than the first weight value.

5. The system of claim 1, wherein the at least one processor is further configured to:

assign a constant weight to the at least one road works observation when the determined traffic density is lesser than or equal to the predefined threshold.

6. The system of claim 1, wherein the road works zone is a construction related road work zone.

7. The system of claim 1, the at least one processor is further configured to:

determine a first location associated with the at least one road works observation, wherein the first location is a location of the corresponding user equipment at a time of capturing the road works observation;

determine a second location associated with the road works object based on the first location and one or more positional offsets applied to the first location; and map match the first location to identify the first lane and map match the second location to identify the second lane.

8. The system of claim 1, wherein to determine the traffic density of the region in vicinity of the road works object, the at least one processor is further configured to perform at least one of:

obtain at least one of: real time traffic feed data, traffic volume estimations, probe counts, and computer vision analysis on image data associated with a plurality of road works observations of road works in the region.

9. The system of claim 1, wherein the at least one processor is further configured to update a map database based on the detection of the road works zone.

10. The system of claim 1, wherein the at least one processor is further configured to generate one or more navigation instructions for the one or more user equipment based on the detection of the road works zone.

11. A method for improving an accuracy of detecting a road works zone by mitigating sensor occlusion, the method comprising:

receiving, from one or more sensors of one or more user equipment, at least one road works observation associated with a road works object;

determining a first lane and a second lane, wherein the first lane is associated with the one or more user equipment capturing the at least one road works observation and the second lane is associated with the road works object, wherein the determining of the first lane and the second lane comprises one or more map matching techniques based on respective locations of the one or more user equipment and of the road works object;

determining traffic density associated with a region in vicinity of the at least one road works observation;

comparing the determined traffic density of the region with a predefined threshold;

filtering the at least one road works observation associated with the road works object based on the comparison;

detecting the road works zone based on the first lane, the second lane and the determined traffic density; and assigning a weight to the at least one road works observation based on the comparison, the first lane, and the second lane, wherein the weight is proportional to a distance between the first lane and the second lane based on the comparison indicating that the determined traffic density is more than the predefined threshold.

12. The method of claim 11, wherein filtering the at least one road works observation, comprises:

based on determining that the determined traffic density of the region is above the predefined threshold, retaining the at least one road works observation for detection of the road works zone when the first lane is adjacent to the second lane.

13. The method of claim 11, wherein filtering the at least one road works observation, comprises:

based on determining that the determined traffic density of the region is below or equal to the predefined threshold, retaining the at least one road works observation for detection of the road works zone irrespective of the first lane being adjacent to the second lane or not.

14. The method of claim 11, wherein filtering the at least one road works observation, further comprises:

assigning a weight to the at least one road works observation based on the comparison, the first lane, and the second lane.

15. A computer program product comprising a non-transitory computer readable medium having stored thereon computer executable instructions which when executed by at least one processor, cause the processor to carry out operations for improving an accuracy of detecting a road works zone by mitigating sensor occlusion, the operations comprising:

receiving, from one or more sensors of one or more user equipment, at least one road works observation associated with a road works object;

determining a first lane and a second lane, wherein the first lane is associated with the one or more user equipment capturing the at least one road works observation and the second lane is associated with the road works object, wherein the determining of the first lane and the second lane comprises one or more map matching techniques based on respective locations of the one or more user equipment and of the road works object;

determining traffic density associated with a region in vicinity of the at least one road works observation;

comparing the determined traffic density of the region with a predefined threshold;

filtering the at least one road works observation associated with the road works object based on the comparison;

detecting the road works zone based on the first lane, the second lane and the determined traffic density; and assigning a weight to the at least one road works observation based on the comparison, the first lane, and the second lane, wherein the weight is proportional to a distance between the first lane and the second lane based on the comparison indicating that the determined traffic density is more than the predefined threshold.

* * * * *